United States Patent Office 3,195,613
Patented July 20, 1965

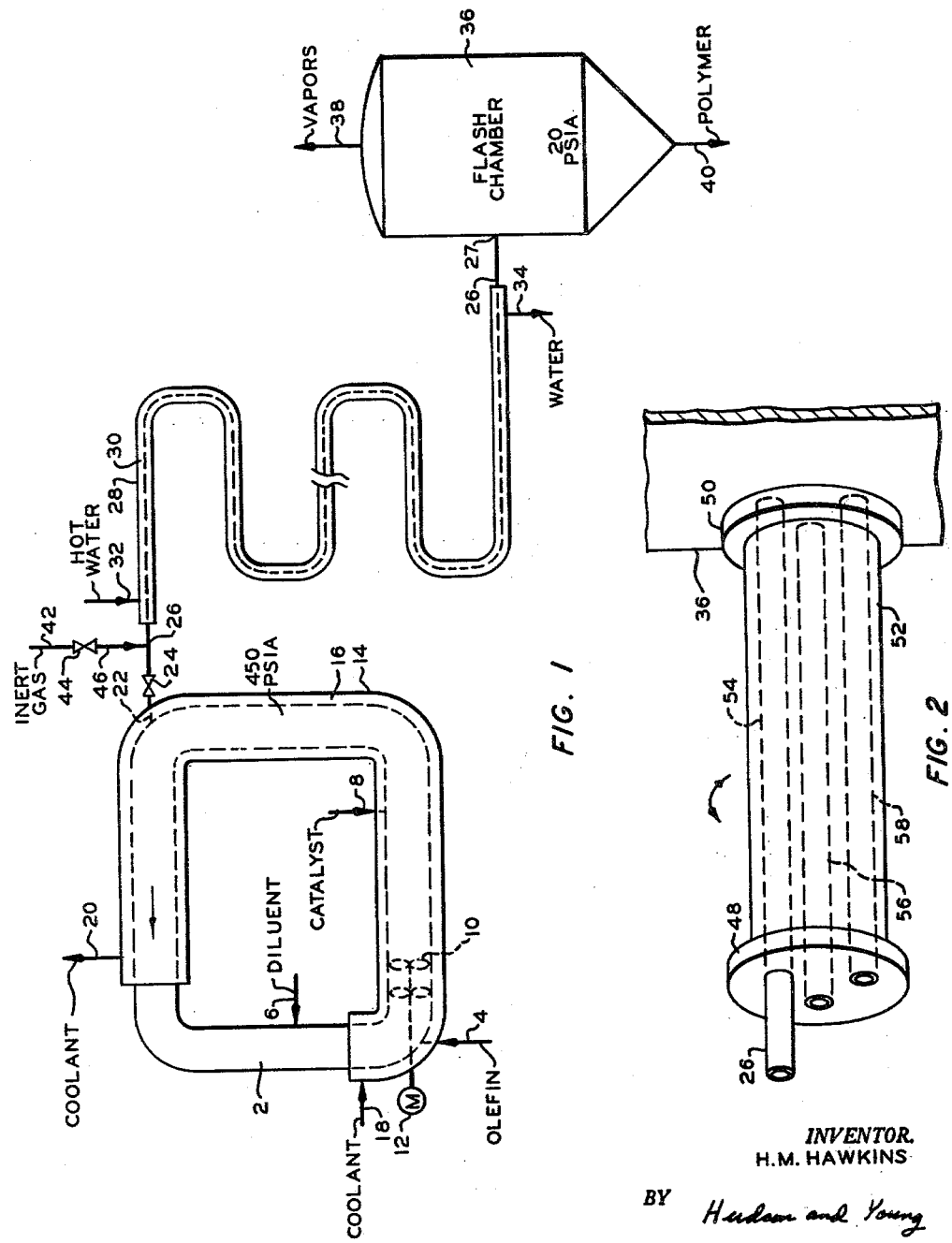

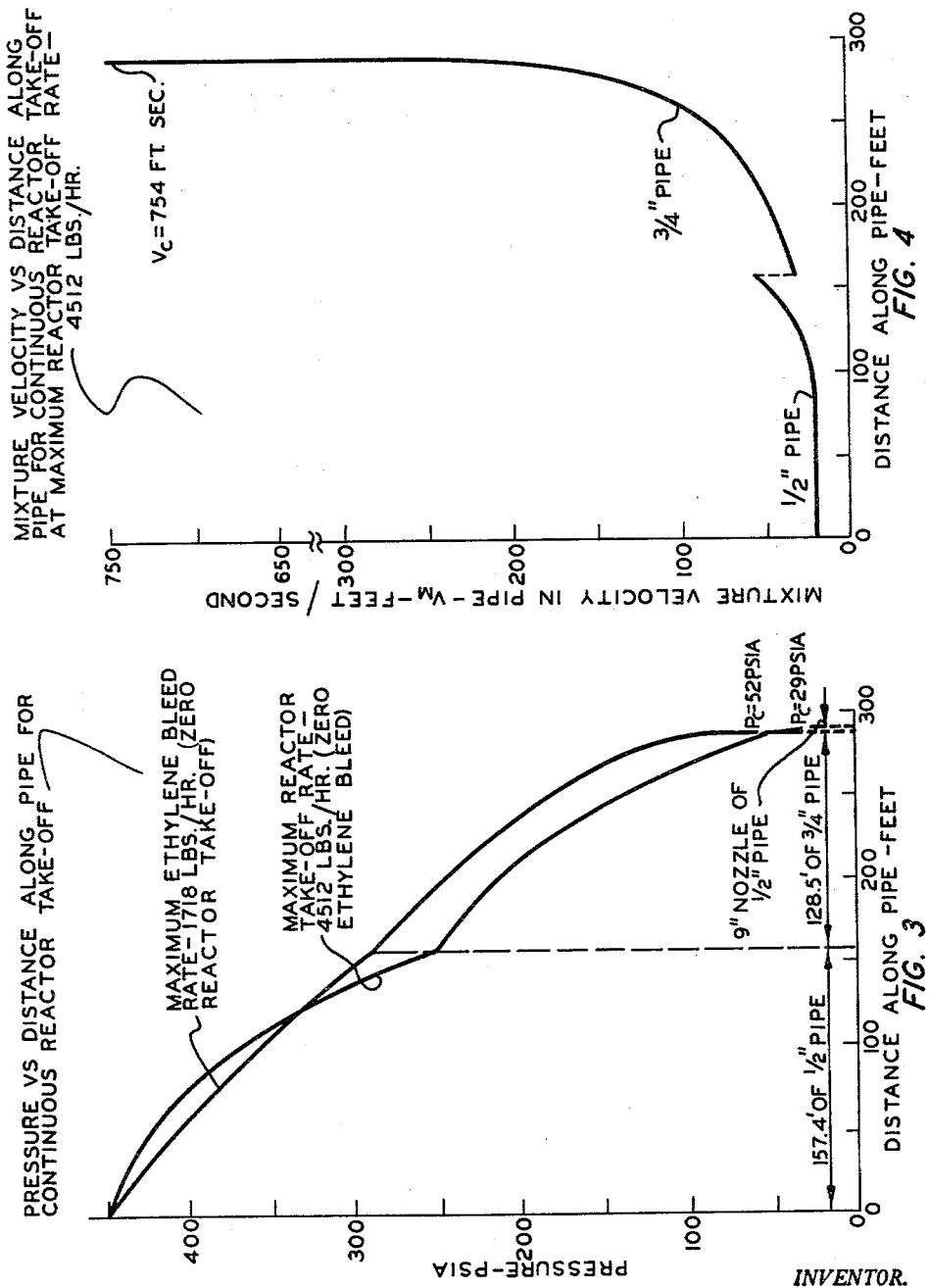

3,195,613
METHOD FOR CONTINUOUSLY DISCHARGING THE CONTENTS OF A PRESSURIZED VESSEL
Harold M. Hawkins, Bartlesville, Okla., assignor to Phillips Petroleum Company, a corporation of Delaware
Filed Oct. 9, 1961, Ser. No. 147,386
4 Claims. (Cl. 159—47)

This invention relates to a method and apparatus for continuously discharging the contents of a pressurized vessel. In one aspect the invention relates to a method and apparatus for controlling the discharge rate of flow while continuously removing the contents of a pressurized vessel. In another aspect the invention relates to a method and apparatus for the removal of a solids-liquid slurry from a pressurized reaction zone to a zone of reduced pressure.

The continuous removal of the contents of a pressurized vessel is frequently a difficult problem since it is usually desirable to remove said contents, e.g., liquids, with a minimum loss of pressure within the vessel itself. Many methods have been proposed for solving this problem but these methods usually require the use of a valve means which is periodically actuated so as to minimize the reduction in pressure. These proposed methods and apparatus are frequently disadvantageous because of the high frequency of valve operation which tends to shorten the valve life and increase the maintenance cost. The problem is particularly aggravated when the contents comprise a liquids-solids slurry comprising a reaction product and when any reduction in pressure would alter the chemical reaction. The presence of a solid in the liquid frequently aggravates the inherent disadvantages of a valve which is intermittently operated because of abrasion or because of polymer deposition on the surfaces of the parts which tend to shorten the valve life and increase the maintenance cost. The same problem exists when using a valve permitting the continuous discharge of the contents by means of an orifice or construction of variable cross section. This type of valve is particularly subject to polymer "bridging," thereby continuously decreasing the opening and requiring periodic shut-downs and cleaning. One example of such a reaction process is the polymerization of ethylene and mixtures of ethylene with other unsaturated hydrocarbons to produce a solid particle form polymer which is then preferably removed from the reaction zone substantially continuously without a substantial reduction in the reaction zone pressure. One method of carrying out the particle form polymerization of ethylene is described in the copending application of Donald D. Norwood, Serial No. 819,391, filed June 10, 1959, and now abandoned. In this copending application a method and apparatus are described for reducing the fouling of reaction surfaces by carrying out the polymerization reaction in a tubular closed loop reaction zone with smooth surfaces. The catalyst, liquid diluent and hydrocarbon reactants are continuously moved through the reaction zone at a velocity sufficient to prevent polymer deposition and in the highly turbulent flow range. Solid particle form product is withdrawn from the reaction zone.

This invention represents an improvement over the method of Norwood, supra, by providing an improved method for the continuous removal of solid polymer product from a pressurized vessel.

It is an object of this invention to provide an improved method and apparatus for the removal of at least a portion of the contents of a pressurized vessel.

It is a further object of this invention to provide a method which comprises steps for removal of at least a portion of the contents of a vessel in which the said contents are under a pressure condition it is desired to maintain.

It is a still further object of this invention to provide an apparatus wherefrom at least a portion of the contents can be and is removed without altering substantially a pressure on the contents in said vessel which it is desired to maintain.

It is another object of this invention to provide an improved method and apparatus for the recovery of solids from a pressurized vessel.

It is another object of this invention to provide an improved method and apparatus for the continuous removal of hydrocarbon diluent-polymer slurry from a pressurized vessel.

Yet another object of the invention is to provide an improved method and apparatus for the recovery of particulate form polymers from a hydrocarbon slurry thereof contained in a continuous path loop reactor operated under superatmospheric pressure.

Still another object of the invention is to provide an improved method and apparatus for controlling the discharge rate of a fluid being continuously removed from a pressurized vessel.

These and other objects of the invention will become more readily apparent from the following detailed description, discussion and claims.

The foregoing objects are broadly accomplished by removing at least the fluid portion of the contents of a confined zone maintained at superatmospheric pressure and introducing said fluid continuously into an elongated confined zone, expanding said fluid within said elongated zone, and discharging the contents of said elongated zone at sonic velocity into a zone of reduced pressure thereby maintaining the discharge rate of flow substantially constant. In one aspect, the fluid is a liquid and is increased to sonic velocity by the vaporization of the liquid.

In one embodiment of the invention the amount of material being removed from the confined pressure vessel is controlled by introducing an inert material into said elongated zone which is expandable under the conditions within said elongated zone.

In another embodiment of the invention the amount of material being removed from the confined zone is regulated by adjusting the interior surface area of at least one portion of the elongated zone.

The method and apparatus of this invention are broadly applicable to any process requiring the continuous discharge of at least the fluid portion of the contents of a vessel maintained at superatmospheric pressure to a zone of lesser pressure with a minimum reduction of pressure within said vessel.

For purposes of simplification the invention is described with reference to a particular process and apparatus for the polymerization of ethylene and mixtures of ethylene with other unsaturated hydrocarbons to produce particle form polymers in a continuous path loop reactor such as described in the copending applications of Norwood, supra. It is to be understood that the method and apparatus of this invention are applicable to many types of reactors and to any process containing a fluid under pressure in a confined vessel. Preferably, the contents will contain a liquid or a solids-liquid slurry; however, it will be understood by those skilled in the art that the process and apparatus are readily adaptable to a container containing only a gas or gas-solids or the removal of a solids by means of a gaseous or liquid transporting media.

It is disclosed in Hogan et al., U.S. Patent No. 2,825,721, that polymers and copolymers can be produced by contacting one or more olefins with a catalyst comprising as an essential ingredient chromium oxide, preferably including a substantial amount of hexavalent chromium, associated with at least one other oxide particularly selected from the group consisting of silica, alumina, zirconia and thoria. The olefin feed used for the polymerization is at least one olefin selected from 1-olefins having a maximum of 8 carbon atoms per molecule and no branching nearer the double bond than the 4-position. Examples of olefins which can be polymerized by the described method include ethylene, propylene, 1-butene, 1-pentene and 1,3-butadiene. Copolymers, such as ethylene-propylene copolymers and ethylene-butadiene copolymers, can also be prepared by utilizing the chromium oxide containing catalyst. The olefins are polymerized in the presence of a hydrocarbon diluent, for example, an acyclic, alicyclic or aromatic compound which is inert.

Recently it has been discovered that there is a critical polymerization temperature range within the broad range disclosed by Hogan et al. in which it is possible to produce increased yields of high molecular weight polymers of ethylene which are insoluble in the hydrocarbon diluent. This polymer is formed in association with the polymerization catalyst and is suspended in the liquid diluent in solid particle form. The preparation of insoluble particle form polymer is disclosed in the copending application of Leatherman et al., Serial No. 590,567, filed June 11, 1956, now abandoned. In the following discussion, the term "particle form polymer" will be employed to designate the insoluble polymers of ethylene formed in accordance with the Leatherman et al. application.

Particle form polymer can be prepared from ethylene and from mixtures of ethylene with other unsaturated hydrocarbons, for example, mixtures of ethylene with minor amounts of higher 1-olefins, such as propylene, 1-butene, 1-pentene, 1-hexene, and the like. Examples of comonomers which can be used with ethylene include 1-olefins having no branching nearer the double bond than the 4-position and conjugated and nonconjugated diolefins. The polymerization reaction is carried out in the presence of a liquid hydrocarbon diluent which is inert in the polymerization reaction and in which the majority of the polymers is insoluble under reaction conditions. Suitable diluents include paraffins such as those having from 3 to 12 and preferably 3 to 8 carbon atoms per molecule, for example, n-butane, n-pentane, isopentane, n-hexane, n-decane, etc., saturated cyclic hydrocarbons such as cyclohexane, cyclopentane and methylcyclopentane, methylcyclohexane, etc. The polymerization reaction temperature will vary depending on the particular liquid diluent which is employed and on the olefin reactants. Usually, however, polymerization is carried out at 230° F. and below, preferably between about 225° F. and about 150° F. The olefin reactants are contacted in the polymerization zone with a suspension of subdivided chromium oxide catalyst in the liquid hydrocarbon diluent under the aforementioned temperatures and under pressures suitable to maintain the diluent in the liquid phase. Concentration of the catalyst in the reaction zone can vary widely; however, generally it will be in the range of 0.001 to 5 percent by weight based on the liquid hydrocarbon diluent. For a more detailed description of the polymerization process including reaction conditions, catalyst, etc., reference can be had to the copending application of Leatherman et al., Serial No. 590,567, filed June 11, 1956, and now abandoned.

A primary problem in the removal of the polymer slurry from the reactor is the reduction in pressure which is necessary. For instance, the reactor may be operated at approximately 450 p.s.i.a. while it is necessary to remove the polymer slurry to approximately atmospheric pressure. By the method and apparatus of this invention not only is it possible to continuously remove the polymer slurry from the reaction zone with a minimum loss of reaction pressure within the reactor but it is also possible to continuously separate the accompanying diluent and unreacted monomers from the polymer solids without the usual additional solids-liquid separation steps. The invention is best illustrated by reference to the accompanying drawing.

FIGURE 1 represents a diagrammatic illustration of the method and apparatus of this invention wherein a polymer slurry is removed from a loop reactor maintained under high pressure and passed into a flash chamber operated at approximately atmospheric pressure.

FIGURE 2 represents a diagrammatic illustration of one type of nozzle which may be used for controlling the rate of discharge of the polymer slurry into the zone of reduced pressure.

FIGURE 3 is a plot of the instantaneous pressure at any particular point along the pipe through which the material passes from the reactor to the flash chamber for a particular pipe diameter and length.

FIGURE 4 represents a plot of the velocity of the mixture in the pipe versus the distance along the pipe for the continuous reactor take-off at the maximum reactor take-off rate for a particular pipe diameter.

As shown in FIGURE 1 a continuous path loop reactor 2, which may have any particular shape but preferably has short horizontal legs and longer vertical legs, is made of flanged straight pipe sections and L's joined together to provide a continuous flow path which is substantially free from obstruction. The reactor is jacketed by a jacket 14 forming an annular space 16 with the reactor 2. By means of inlet 18 and outlet 20 a heat exchange fluid is permitted to flow through the annular space 16 to assist in the control of the temperature of the reactor. The monomer, diluent and catalyst are introduced into reactor 2 through conduits 4, 6 and 8, respectively. Thermocouples can be provided for sensing the temperature in the reactor and provision can be made to transmit the measurement of reaction temperature to a temperature recorder controller (not shown) which can be utilized to control the reactor temperature. Various control methods can be used including control of the heat exchange fluid to jacket 16, control of the quantity and/or temperature of reactants entering the reactor, control of the amount of catalyst entering the reactor, etc. The contents within the reactor are continuously propelled throughout the reactor by the propelling means 10 driven by motor 12. Reference is made to the Norwood patent application, supra, for details as to the conditions to be maintained within the reactor for the polymerization of the olefin to the particle form polymer.

The polymer is continuously moved through the reactor at a velocity sufficient to prevent polymer deposition in the reactor and in a highly turbulent flow range. After the reactor has attained equilibrium conditions, polymer is permitted to be discharged through conduit 22, which is in open communication with the interior of the reactor 2, by opening valve 24 thereby permitting the polymer solids-liquid slurry to pass through conduit 26 into flash chamber 36. Conduit 26 is an elongated confined zone of sufficient length and diameter to permit the transporting fluid to expand by pressure reduction and vaporization so that the mixture attains sonic velocity (or acoustic velocity) in at least one point in the conduit system. Preferably, the diameter and length are chosen so as to also permit the complete vaporization of the diluent prior to introduction of the slurry into the flash chamber. This is frequently best accomplished by heating the conduit 26 by any suitable means such as a jacket 28 which forms an annular space 30 with the conduit 26. Of course, the desired velocity can also be achieved without the addition of heat by the proper selection of pipe diameter and length. Hot water is introduced through conduit 32 and removed through conduit 34. The selection of the particular pipe diameter and length depends on factors such as the material being withdrawn from the reactor, the temperature and the pressure within the reactor and the pressure of the flash chamber or area of reduced pressure and heat transfer requirement. It is possible to attain sonic velocity in a pipe of a given diameter and length in a distance shorter than that necessary to completely vaporize the material. In such instances, it may be desirable to withdraw the slurry from the pressure vessel through a pipe of a given diameter for a given distance and then expand the pipe diameter for a distance sufficient to permit the necessary thermal transfer with a minimum of further pressure reduction and then reintroduce the resultant vapor-polymer mixture into a section of pipe having a smaller diameter for ejection into the flash chamber.

Although the mechanism is not completely understood it is believed that as the reactor effluent flows through the pipe the pressure decreases due to wall friction and the effluent progressively vaporizes due to the lower pressure. The specific volume of the effluent stream increases as the fraction vaporized increases and as the pressure decreases. The velocity of the effluent stream entering increases with specific volume. Thus, the system expends the available pressure energy in two ways:

(1) Pressure drop resulting from the frictional forces acting during multiphase flow; and
(2) Pressure drop resulting from the rate of increase of momentum, i.e., acceleration, of the mixture as it flows through the pipe and vaporizes.

Flash chamber 36 is maintained at any desired pressure level below the critical pressure, preferably within a few pounds per square inch of the critical pressure attained at or near the terminus of the conduit 26.

The maximum mixture velocity which occurs at or near the terminus of the elongated conduit or the inlet of the flash chamber is different for each material and system and is the sonic (acoustic) velocity for adiabatic flow through the particular nozzle used having an upstream pressure somewhat greater than the critical pressure.

From flash chamber 36 the vapors are removed through conduit 38 and the polymer solids are removed through conduit 40 for further processing. By the method and apparatus of this invention the polymer solids are substantially diluent free.

It is frequently necessary to curtail the amount of polymer slurry being removed from the reactor for such reasons as a reduction in activity of the catalyst resulting in the formation of a reduced amount of polymer. At least two separate methods are provided herein for controlling the reactor take-off rate. In one embodiment an inert gas, such as ethylene, or an inert material which is gaseous at the conditions present in the elongated conduit, is introduced into conduit 26 via conduit 42, valve 44 and conduit 46. Since the maximum rate of flow has been attained at point 27, a portion of the diluent being removed from the reactor is displaced by the inert gas or liquid so that a smaller amount of material is removed from the reactor although the total weight rate of flow passing point 27 is maintained substantially constant. The maximum amount of inert gas added exists when there is a minimum reactor take-off. Again, the amount that can be discharged is determined by the flow rate for the inert gas through the nozzle at the end of the letdown system and is different for each particular system. For instance, when removing a copolymer of ethylene-butene solids-normal pentane liquid slurry from a reactor maintained at 450 p.s.i.a. at the rate of 4,512 pounds per hour with a zero ethylene bleed through a pipe having an initial ½ inch nominal diameter for 157.4 feet, a ¾ inch nominal diameter for 128.5 feet and a ½ inch nominal diameter for the final 9 inches, the critical pressure for this mixture at point 27 of FIGURE 1 is 29 p.s.i.a. and the sonic velocity is 754 feet per second; however, for the same system when there is a minimum of reactor take-off, i.e., 0 pounds per hour, but a maximum ethylene bleed rate of 1,718 pounds per hour, the critical pressure for the ethylene is 52 p.s.i.a. at the same point 27.

FIGURE 3 represents a plot of the pressure within the removal pipe versus the distance along the pipe for the continuous removal of an ethylenebutene polymer slurry from the reactor.

FIGURE 4 represents a plot of the velocity of the mixture of FIGURE 3 contained within the pipe versus the distance along the pipe for the continuous removal of a polymer slurry at maximum reactor take-off rate of 4,512 pounds per hour.

Although these graphical illustrations are specific for the particular system discussed in the immediately preceding paragraphs, it is believed representative of the conditions which would exist for other systems although the absolute values could be significantly different.

A second possible method within the scope of this invention of controlling the reactor take-off rate is by varying the interior surface area of at least one portion of the elongated zone, such as varying either the length of the final section of the take-off system or the area or both. It is also within the scope of the invention to utilize this aspect of the invention in conjunction with the inert gas injection aspect. Increasing the length of the nozzles results in a decrease of mass flow rate through it. A decrease in the area also decreases the flow rate through the nozzle. Thus, the reactor take-off rate can be varied by diverting the flow through any of several available nozzles of various lengths and/or areas. An illustrative example of this type of reactor discharge nozzle is shown in FIGURE 2. As shown in the drawing the discharge terminus of conduit 26 contains a nozzle comprising a rotatable housing 52 containing a series of passageways 54, 56 and 58 of different diameters. Flanges 48 and 50 serve to connect the housing 52 and conduit 26. By rotating housing 52 by any suitable means (not shown) the operator can determine the nozzle diameter which will control the flow rate within the desired values. In other words, if it is desired to decrease the withdrawal rate of polymer slurry from the reactor 2 the operator may rotate housing 52 so as to intercept conduit 26 with a passageway having a smaller diameter than that previously being used, or vice versa. Due to the decrease in pipe diameter the amount of material being discharged will decrease although the discharge rate will be at the new sonic velocity so that there will be no fluctuations in rate. Since this type of nozzle will provide a series of stepwise changes unless an infinite number of passageways are provided, it is frequently desirable, although not necessary, to combine this feature with the inert gas injection feature to provide a "fine tuning" control.

The amount of heat necessary to be introduced into the conduit 26 by means of jacket 30, or any other heating means, depends upon the thermal transfer characteristics of the pipe and its contents. For instance, if the pipe is of small diameter, it is possible to achieve a rapid reduction in pressure due to friction without sufficient time to introduce the required amount of heat to vaporize the solvent. With regard to the particular process herein described, the length of pipe must be such that it generates the pressure drop necessary to achieve sonic (acoustic) velocity and at the same time permit the heat transfer required for vaporization of at least a portion of the liquid in the pipe, if a liquid is present. If a gaseous transporting media is used, vaporization is, of course, not required and a shorter pipe length is possible.

Sonic velocity or acoustic velocity is defined herein as the maximum velocity that can be obtained by a specific mixture at a specific temperature in a conduit of constant cross section. The velocity of sound is preferably obtained at the exit terminus of the pipe.

The invention is further illustrated by the following example.

EXAMPLE

An ethylene-butene-1-copolymer is produced by the method of Leatherman et al., supra, in a 3,400 gallon continus path loop reactor such as described in Norwood, supra, at a temperature of 190° F. and 450 p.s.i.a. using catalyst comprising chromium oxide associated with silica-alumina and containing hexavalent chromium. The reactor effluent had the following composition:

Table I

| Component: | Reactor effluent, pounds per stream day |
|---|---|
| Methane | 15 |
| Ethane | 36 |
| Ethylene | 10,304 |
| Butene-1 | 2,061 |
| Inert butane | 785 |
| Normal pentane | 77,976 |
| Polymer | 17,100 |
| Catalyst | 17 |
| Total, pounds per stream day | 108,294 |
| Total, pounds per hour | 4,512 |

The polymer-liquid slurry is continuously removed from the reactor at a maximum discharge rate of 4,512 pounds per hour through the following letdown pipe into a flash tank maintained at 20 p.s.i.a.

Table II

| | |
|---|---|
| ½ inch pipe (initial section), feet | 157.4 |
| ¾ inch pipe (intermediate section), feet | 128.5 |
| ½ inch pipe nozzle (discharge terminus), inches | 9 |
| Total length, feet | 286.7 |

Water is introduced into a jacket surrounding the letdown pipe at a point adjacent the reactor at 200° F.

The total length of the pipe required was found by graphically integrating a plot of the reciprocal of the total instantaneous pressure drop expressed as pipe length/unit pressure drop between 450 and 50 p.s.i.a. The maximum mixture velocity which occurs at the outlet of the third section of the letdown system is 754 feet per second and is the critical or acoustic velocity for adiabatic flow through the 9-inch nozzel with an upstream pressure of 50 p.s.i.a. at the nozzle inlet and discharging into a 20 p.s.i.a. reservoir. The critical pressure at the letdown system outlet is 29 p.s.i.a. An over-all heat transfer coefficient of greater than 1,000 was used for the froth flow regime, and 488 for the dispersed flow regime. By the selection of this pipe length and diameter the material ejecting into the flash tank is at its acoustic or sonic velocity and thus a constant weight rate of flow is maintained.

When a change of condition within the reactor results in decreased polymer production it becomes necessary to introduce ethylene into the letdown pipe so as to reduce the amount of polymer removed from the reactor. The ethylene is compressed and added to the letdown system downstream of the reactor. The maximum flow rate for the ethylene gas is 1,718 pounds per hour and is governed by the critical flow rate for ethylene through the nozzle at the end of the letdown system. The critical pressure at the end of the letdown system at maximum flow rate is 52 p.s.i.a. when only ethylene is passing through the letdown system. Of course, any intermediate flow rate from the reactor is obtainable by the injection of an intermediate amount of inert material.

While certain examples, structures, composition and process steps have been described for purposes of illustration, the invention is not limited to these. Variation and modification within the scope of the disclosure and the claims can readily be effected by those skilled in the art.

I claim:

1. A method for the discharge of a solids-fluid slurry from a first pressure zone to maintain substantially constant pressure therein, said method comprising introducing slurry, as removed from said first pressure zone, into an elongated confined zone, vaporizing substantially all the liquid of said slurry during flow through said elongated confined zone, and passing said contents into a third zone operating at a pressure less than about half that of said first zone, the pressure differential between said first zone and said third zone and the size of said elongated confined zone being such for the amount and condition of the slurry that sonic velocity is attained by the slurry flowing through said confined zone, thus obtaining and maintaining a desired discharge rate of slurry from said first zone by build-up of pressure in said elongated confined zone.

2. The method of claim 1 further comprising introducing an expansible material inert to said slurry into said confined zone to regulate the introduction of said slurry thereinto to maintain a desired discharge rate of slurry from said first zone.

3. The method of claim 1 further comprising adjusting the interior surface area of at least a portion of said confined zone to regulate the discharge of said contents from said first pressure zone to minimize pressure variation in said first zone.

4. A method for the discharge of a solids polymer-diluent slurry from a polymerization reactor zone operating under superatmospheric pressure to maintain substantially constant pressure therein, said method comprising introducing slurry as removed from said first pressure zone into an elongated confined zone, vaporizing substantially all the liquid diluent during flow through said elongated confined zone, and passing the slurry into a flash zone operating at a pressure less than about half that of said reactor zone, the pressure differential between said reactor zone and said flash zone and the size of said elongated confined zone being such for the amount and condition of the slurry that sonic velocity is attained by the slurry flowing through said confined zone, thus obtaining and maintaining a desired discharge rate of slurry from said reactor zone by build-up of pressure in said elongated confined zone.

References Cited by the Examiner

UNITED STATES PATENTS

| | | | |
|---|---|---|---|
| 2,132,333 | 10/38 | Wendell et al. | 239—394 |
| 2,388,093 | 10/45 | Smith | 239—394 |
| 2,467,769 | 4/49 | Morrow et al. | 159—2 X |
| 2,572,321 | 10/51 | Deanesly | 159—47 |
| 2,658,054 | 11/53 | Coleman et al. | 159—47 X |
| 2,689,839 | 9/54 | Heckert | 159—47 X |
| 2,710,057 | 6/55 | Bassett et al. | 159—47 |
| 2,853,127 | 9/58 | Sessen | 159—47 |
| 2,868,280 | 1/59 | Sargent et al. | 159—2 X |
| 3,073,380 | 1/60 | Palmason | 159—49 |

NORMAN YUDKOFF, *Primary Examiner.*

GEORGE D. MITCHELL, *Examiner.*